United States Patent [19]
Barrett, Jr.

[11] 3,871,919
[45] Mar. 18, 1975

[54] BATTERY PLATE FORMING APPARATUS

[76] Inventor: James H. Barrett, Jr., 3863 Surrey Rd., Toledo, Ohio 43615

[22] Filed: Sept. 24, 1969

[21] Appl. No.: 860,620

[52] U.S. Cl................... 136/82, 136/79, 136/166
[51] Int. Cl............................................. H01m 35/18
[58] Field of Search................ 136/82, 79–81, 136/166, 177, 163, 179, 180; 211/41, 126; 312/10, 234, 234.4

[56] References Cited
UNITED STATES PATENTS

| | | | |
|---|---|---|---|
| 604,588 | 5/1898 | Lloyd | 136/177.1 |
| 863,347 | 8/1907 | Berst | 136/163.5 |
| 1,770,974 | 7/1930 | Everett | 136/163.6 |
| 3,090,823 | 5/1963 | Roach | 136/82 |
| 3,097,900 | 7/1963 | Berta et al. | 312/234 |
| 3,166,447 | 1/1965 | Bronstert et al. | 136/82 |
| 3,261,719 | 7/1966 | Shannon | 136/166 |
| 3,287,174 | 11/1966 | Hennigan et al. | 136/177 |
| 3,365,071 | 1/1968 | Ottinger | 211/126 |
| 3,369,937 | 2/1968 | Himy | 136/166 |
| 3,402,077 | 9/1968 | Kida et al. | 136/6 |

Primary Examiner—John H. Mack
Assistant Examiner—C. F. Lefevour

[57] ABSTRACT

A battery plate forming tank having a removable cover with a filter vent therein to permit the gases generated in the forming process to escape but to condense and retain acid vapors in the tank. An adjustable rack is located in the tank for supporting spaced parallel battery plates with their shorter sides vertical and their longer sides horizontal for easy viewing and access.

2 Claims, 7 Drawing Figures

INVENTOR.
JAMES H. BARRETT, JR.
ATTORNEY

INVENTER.
JAMES H. BARRETT, JR.
BY
Hugh A Kirk
ATTORNEY

INVENTER.
JAMES H. BARRETT, JR.
BY
ATTORNEY

BATTERY PLATE FORMING APPARATUS

BACKGROUND OF THE INVENTION

In the process of manufacturing lead-acid secondary batteries, such as used in vehicles and industry, it is important that the positive and negative lead plates of the battery be charged and discharged at least a couple times under controlled conditions to be assured to properly formed plates before the plates are placed in the battery. This is accomplished by being sure that substantially all the lead sulfate paste used in filling the lead grids of the plates has been formed or converted into the spongy lead for the negative plate and into lead peroxide for the positive plate.

The lead sulfate paste is produced from lead peroxide and sulfuric acid particles which paste is pressed into the lead grids and dried. These lead grids are cast with tabs at at least two of their opposite corners for easy connection to electric terminals such as by soldering or fusing to lead conductors. The resulting plates are then connected together as they will later be in a battery and submerged in the forming tanks and covered with an aqueous solution of sulfuric acid having proper specific gravity and charged and discharged two or three times to form the plates.

It is in the carrying out of this forming process that the apparatus of this invention has been developed. Previously battery plate forming tanks were deep with the longitudinal dimensions of the plates submerged vertically as they usually are mounted in batteries. Thus the tabs for soldering the plates to conductors were directly above the long plates and solder could be easily dropped between the plates causing shorts and these shorts could not be easily viewed through the depth of the tank.

Furthermore, previous plate forming tanks had open tops to permit the escape of the hydrogen and oxygen gases which are given off during the forming process and which carry with them minute droplets of corrosive sulfuric acid.

Accordingly it is an object of this invention to overcome these difficulties, produce a rack which is adjustable to fit different sized plates, and to prevent the loss and escape of corrosive vapors from the tanks without building up pressure of highly explosive gases in the forming tanks.

SUMMARY OF THE INVENTION

Generally speaking the apparatus of this invention comprises an open top rectangular non-corrosive plastic or hard rubber relatively shallow box or tank into which are set one or more adjustable non-corrosive plastic racks or supporting frames for alternate positive and negative lead battery plates which are to be charged and discharged to form the spongy lead and lead peroxide therein before installation into commercial batteries.

One of the important features of this invention is providing a concave plastic cover which rests or seats on the top edge of the open box or tank, which cover has a filter vent therein. The concave cover causes most of the liquid in these gases to condense on its underside and drip back into the center portion of the tank, and the vent permits the escape of the hydrogen and oxygen gases formed during the charging and discharging operations. The filter medium in the vents may comprise a perforated container for a non-corrosive porous material such as glass fibers. The tanks may be connected in groups, and are provided with apertures in their side walls near their tops for passage of conductors therethrough for electrically connecting together the battery plates in adjacent tanks. Also, the bottom of the tanks may be provided with drain openings.

An adjustable frame or rack for the plates may rest on the inside flat bottom of the tank, which rack is so constructed that the rectangular plates are supported with their shorter dimensions vertical and their longer dimensions horizontal so that the whole of each plate can readily be viewed from the top of the tank through the shallow depth of the liquid in the tank which covers them.

This adjustable rack comprises a pair of parallel side walls and a pair of parallel end walls, at least one pair being provided with a plurality of facing horizontally spaced parallel vertical grooves. These walls are of sufficient height to accommodate the widest battery plates to be supported therein. The vertical grooves in the side walls correspond in spacing to the different length battery plates, and seat the opposite edges of the end walls which support and position these plates. The parallel vertical grooves in the end walls are for locating the opposite end or shorter edges of the plates and spacing them uniformly and parallel to each other and parallel to the two side walls.

In order that alternate positive and negative plates will extend at opposite ends of the frame above the vertically grooved end walls, alternate grooves in these walls are notched at their top edge. Thus all the positive plates will be tilted upwardly by one of their end tabs resting between the notches along the top of one end wall, while the negative plates will be tilted in the opposite direction by their end tabs resting in the notches on that end wall, and vice versa for the other notched end wall. In this manner the plate end tabs resting between the notches on top of the end walls can readily be soldered together for connection to the electrical charging and discharging apparatus without solder from the connection dropping between the plates and causing any short circuits.

The two side walls of the rack may be held together by rod, bolt or tie means adjacent the outside of the end walls to insure that the vertical edges of the end walls are retained in their corresponding grooves in the side walls.

BRIEF DESCRIPTION OF THE DRAWINGS

The above mentioned and other features, objects, advantages, and the manner of attaining them are described more specifically below by reference to an embodiment of this invention shown in the accompanying drawings, wherein.

DETAILED DESCRIPTION OF PREFERRED EMBODIMENT

I Tank and Cover

Figure 1:
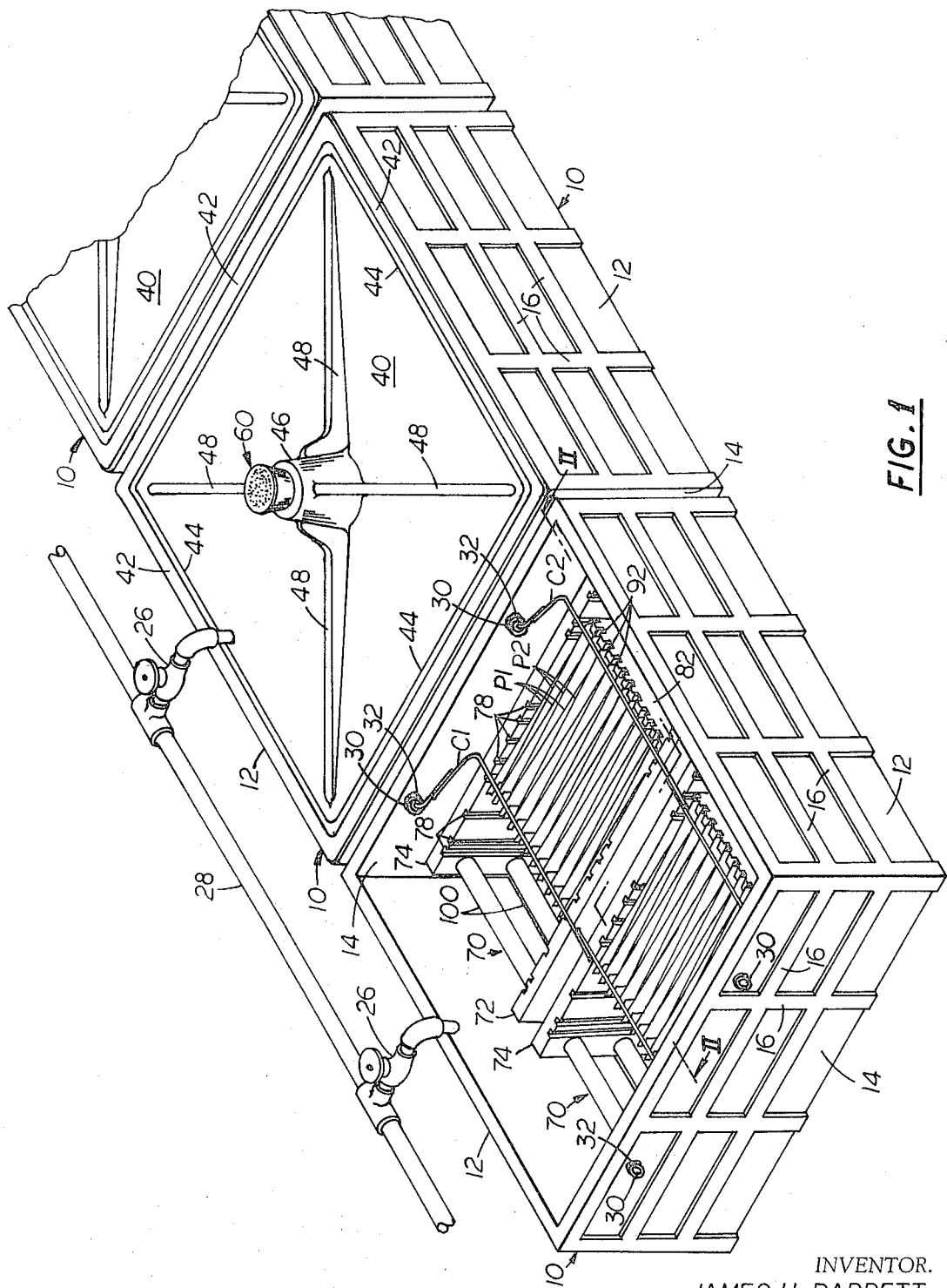
FIG. 1 is a perspective view of an end of a row of tanks according to this invention with the cover removed from one of the tanks showing the adjustable rack and battery plates therein.

FIG. 1 discloses part of a row of a plurality of battery plate forming boxes comprising rectangular shaped open top tanks 10 of a non-corrosive material such as plastic or hard rubber. The opposite parallel vertical side walls 12 and 14 of this tank 10 may be provided with reinforcing ribs 16, and a flat horizontal bottom 18 which may be provided with a drain 20 (see FIGS. 2 and 5). This drain 20 is normally closed either by a stopper (not shown) or a valve 22 which may be connected to a non-corrosive duct or manifold 24. Adjacent and spaced above the top of each of the tanks 10 there may be provided a liquid or acid filling non-corrosive spigot 26 which may be connected to a common non-corrosive pipe or duct 28. The side walls 14 also may be provided with two spaced apertures 30 just below their top edges for the passage of conductors therethrough for connection to the plates P1, P2, P4, and P5 to be formed.

Each of the open top rectangular tanks 10 is provided with a removable concave cover 40 of a non-corrosive material, such as a molded polyethylene plastic. This cover is rectangular in shape and formed so that its peripheral flange 42 rests upon the top upper edge of the side walls 12 and 14 of the tank 10, and its depending peripheral ridge 44 fits just inside the upper inner corner edge of the walls to center and seat the cover 40 on the tank 10. The particular concave configuration of this cover 40 shows a central cylindrical hub or boss portion 46 from which extend diagonal reinforcing ribs 48. However, the configuration of the cover 40 with its concave inner or under surface may be made with other reinforcement means than the ribs 48. Thus any acid vapors which collect or condense on the under side of the cover 40 will generally be directed to run toward the center of the tank 10 at the lower edge of the boss 46 before dropping back into the tank, and the depending ridge 44 prevents this condensate from running out under the flange 42 and outside the tank 10.

Figure 3:
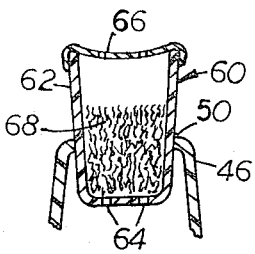
FIG. 3 is an enlarged vertical sectional view of the filter vent shown in the center of the cover for the tank in FIGS. 1 and 2.

The hollow hub or boss portion 46 contains a central circular aperture or vent 50, and is provided with filter means 60. This filter means 60 preferably is located in the hollow boss 46, and herein is shown to comprise a plastic frusto-conical cup 62 wedged into the vent 50. This cup 62 (see FIG. 3) has a perforated bottom 64, a removable perforated lid 66, and contains a porous non-corrosive or acid-resistant filter medium 68, such as a mat of glass fibers. Thus this filter means 60 prevents the escape of acid vapors and still permits the escape of the hydrogen and oxygen gas produced during the charging and discharging of the plates in the tank 10. When the filter medium 68 becomes clogged it may easily be replaced by either replacing the whole cup 62, or removing its cover 66 and replacing the glass fibers 68 therein.

II Plate Rack

Figure 2:
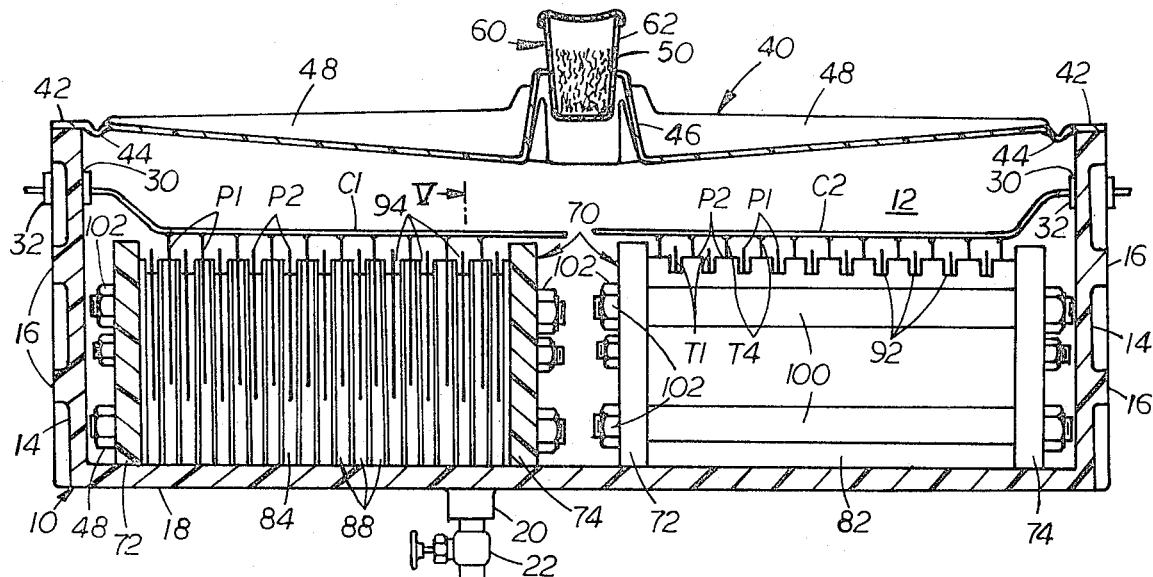
FIG. 2 is an enlarged sectional view taken along line II — II of FIG. 1 showing the end of one of the racks and a vertical section through the other rack in one of the tanks, plus a section through a concave cover for the tank with its filter vent therein.
Figure 4:
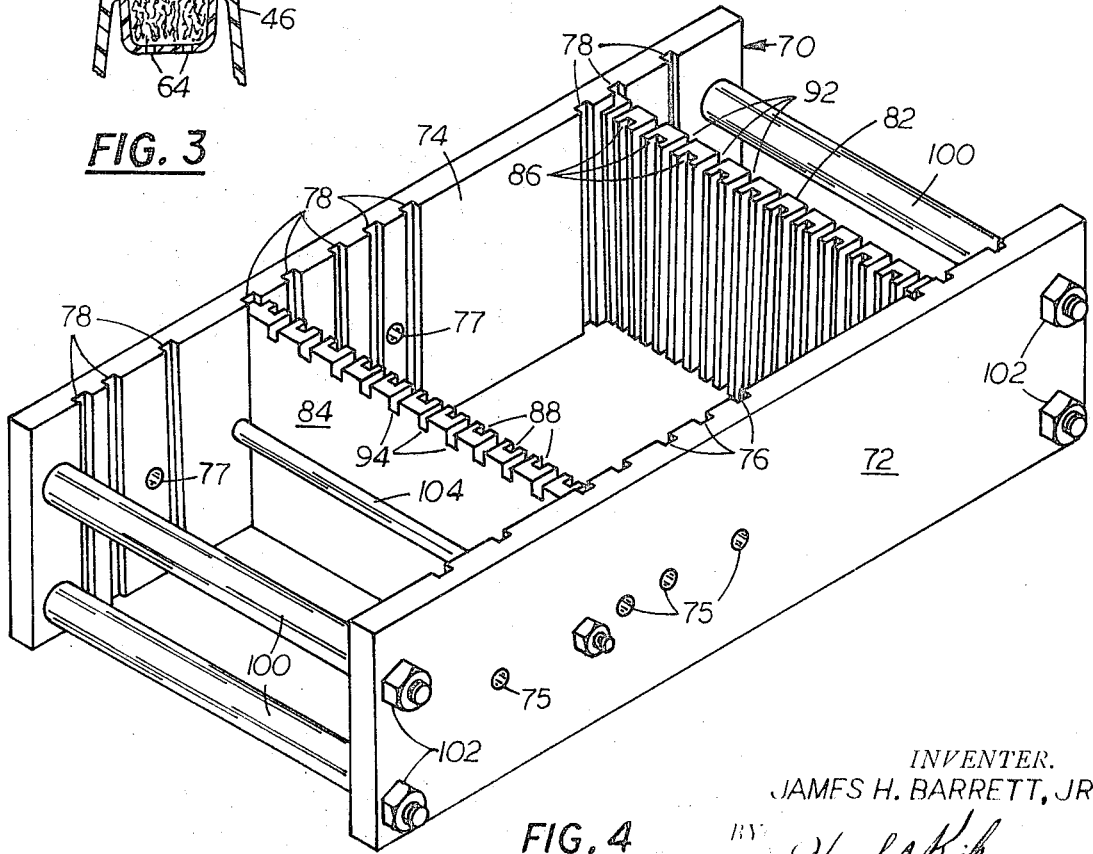
FIG. 4 is an enlarged perspective view of one of the adjustable frames or racks shown in the tanks of FIGS. 1 and 2 with the battery plates removed therefrom.
Figure 5:
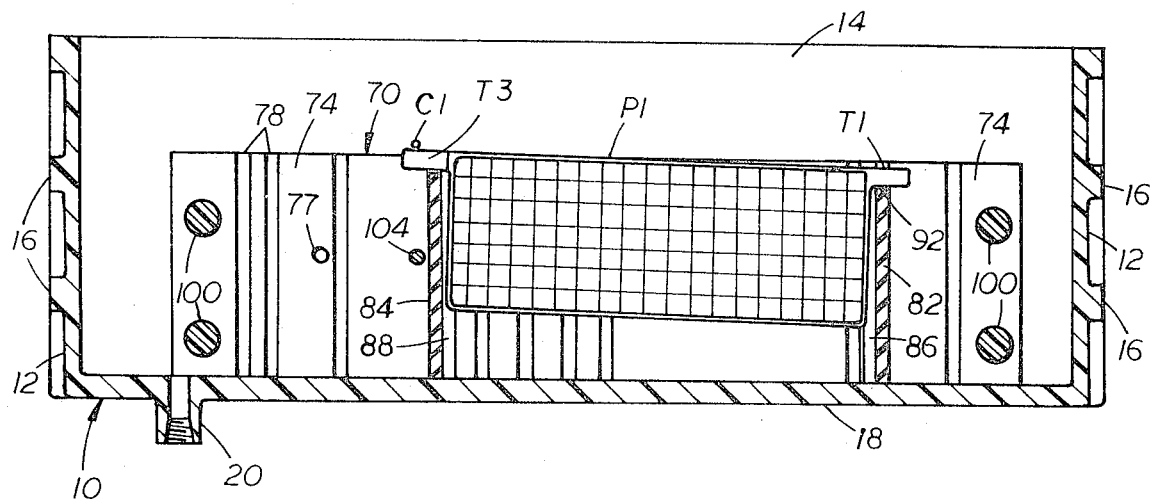
FIG. 5 is a vertical section taken along line V — V of FIG. 2 showing the rack in the tank and how one of the plates supported therein is tilted for contact with the conductor at the left end thereof.

One of the racks 70, shown inside the tanks 10 in FIGS. 1, 2, and 5, is shown in perspective in FIG. 4, and comprises two opposite parallel and complementary side walls 72 and 74, and two opposite parallel and complementary end walls 82 and 84. The sidewalls 72 and 74 may have facing parallel vertical grooves 76 and 78, which grooves are spaced to correspond to the different length battery plates P1, P2, P4, and P5. In these grooves 76 and 78 are seated the vertical edges of the parallel and complementary end walls 82 and 84 which have facing uniformly spaced parallel vertical grooves 86 and 88. These grooves 86 and 88 seat and space the end edges of the parallel positive and negative plates P1 and P2 (see FIGS. 1 and 2) between the side walls 72 and 74. Although the spacing between the grooves 76 and the grooves 78, shown in the side walls 72 and 74 respectively, is adapted for taking six different sizes of battery plates, additional grooves may be provided.

Alternate ones of the end wall grooves 86 and 88 are provided with notches 92 and 94, respectively, for the permanent end tabs T1 and T2 (see FIGS. 5, 6, and 7) on the plates P1, P2, P4, and P5. The other break-off end tabs T3 and T4 support the plates on the unnotched tops of the end walls 82 and 84. Thus, alternate positive and negative plates P1, P5, and P2, P4, respectively, are tilted in opposite directions as shown in FIGS. 1, 2, 5, 6, and 7 so that the conductors C1 may be connected or soldered to the break-away tabs T3 of all the positive plates P1 or P5, as shown in FIGS. 1, 2, 5, and 7, and the conductors C2 may be connected or soldered to all the break-away tabs T4 of the negative plates P2 and P4, as shown in FIGS. 1, 2, and 6.

These conductors C1 and C2 extend through apertures 30 in the side walls 14 of the tank 10, which apertures 30 may be sealed by cylindrical gaskets 32 which fit snugly around the conductors C1 and C2, and prevent leakage of vapors out of the tank 10. These conductors C1 and C2 are then connected to the plates in the next adjacent tank so that the plates in each tank are connected in parallel, and the parallel groups of plates in each tank are connected in series with the plates in other tanks 10. The end tabs T3 and T4 of the positive and negative plates may be removed after the plates are formed, and the other end tabs T1 and T2 on the positive and negative plates may be used for their connections in the battery.

Near the ends of the side walls 72 and 74 there may be provided tie bolts, rods, or bars 100 with nuts 102 on their threaded ends for holding the side walls 72 and 74 together and retaining the end walls 82 and 84 in their seats or grooves 76 and 78. When shorter battery plates P1, P2 and P5 are to be formed, an additional tie rod 104 may be employed between the ends of the side walls and adjacent the end wall 84. For this purpose additional apertures 75 and 77 are provided in the side walls 72 and 74 through which an additional tie bolt 104 may be positioned to prevent outward bending of side walls 72 and 74.

Figure 6:
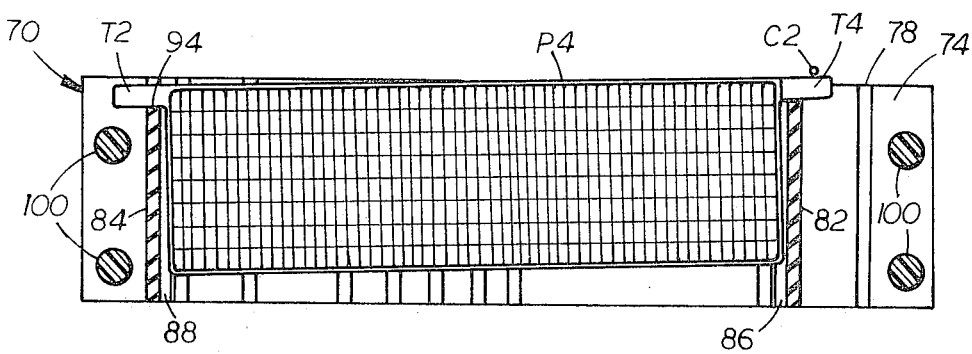
FIG. 6 is a view of just the rack similar to FIG. 5 but showing a much larger battery plate supported therein but with its other or right end tilted upwardly for electrical connection thereto.
Figure 7:
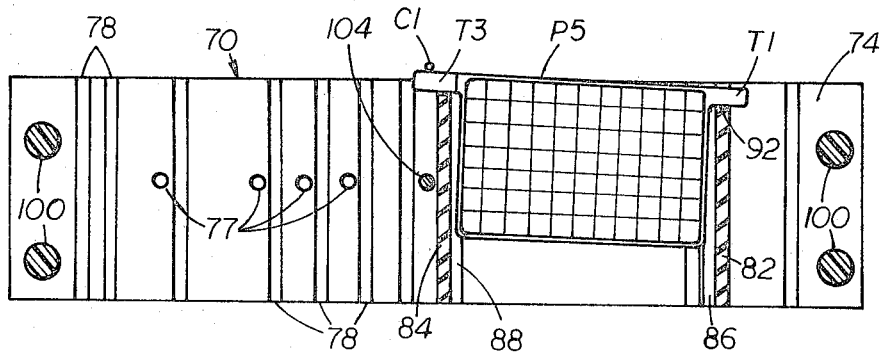
FIG. 7 is a view of the rack shown in FIG. 6 but with the end walls adjusted inwardly for supporting a smaller battery plate than that shown in FIG. 5.

In FIGS. 6 and 7 there are shown larger and smaller battery plates P4 and P5 respectively, than the plates P1 and P2 shown in FIGS. 1, 2, and 5, and a corresponding different location for the end wall 84 in a different pair of grooves 76 and 78. In FIG. 6 the additional tie rod 104 is not required, while in FIG. 7 for the shorter plate P5 it is required and employed as shown.

Thus, the frame support or rack 70 shown in FIG. 4 is adjustable for different size plates of different lengths, and is of sufficient height so the plates do not touch the bottom 18 of the tank 10, but the end walls 82 and 84 do rest on the bottom 18 of the tank 10 and support substantially all the weight of the battery plates.

The walls and tie bolts of the racks 70 are preferably made out of non-corrosive acid-resistant material, such as hard rubber or polyethylene plastic, or combinations thereof.

Although two racks 70 are shown in each of the rectangular tanks 10 in FIG. 1, it is to be understood that one or more than two racks may be employed in each tank 10 depending upon the size of the tanks.

I claim:

1. In a series of battery plate forming boxes for transforming lead sulfate paste used in filling the lead grids of the negative and positive plates into spongy lead and lead peroxide, respectively, each box being independent of each other and each having its own electrolyte and separate non-corrosive plastic rack for supporting plates to be formed with their longer sides horizontal for easy viewing, each said box comprising:
   A. a shallow open non-corrosive plastic tank having an upper peripheral horizontal edge, vertical side walls and a flat horizontal bottom, and at least one aperture below said edge in a side wall for an electrical conductor connected to the plates to be formed, and having a normally closed drain in said bottom,
   B. means for sealing the conductor in said aperture,
   C. a removable non-corrosive plastic cover for the top of said tank having a peripheral flange resting on said peripheral edge, a depending peripheral ridge inside said flange adjacent said side walls, an under surface which slopes downwardly and inwardly from said peripheral edge to an aperture, which surface directs condensate away from the edges of said cover to drip back into the tank,
   D. a replaceable filter means in said aperture in said cover to permit gases generated in said tank to escape but to condense and retain acid vapors, and
   E. a spigot above each tank for filling it with liquid; said rack being adjustable for supporting the battery plates in said tank, said rack comprising:
      a. a pair of vertical parallel side walls,
      b. a pair of vertically slotted parallel end walls having ends against said side walls, said end walls having alternately notched top edges, and
      c. means for adjusting the distance between said end walls.

2. In a series of battery plate forming boxes, each box being independent of each other and each having its own electrolyte and separate rack for supporting plates to be formed, each said box comprising:
   A. an open top tank having at least one aperture in its side for an electrical conductor connected to the battery plates to be formed,
   B. means for sealing said conductor in said aperture,
   C. a removable cover for the top having
      a. a filter vent therein, and
      b. means on the lower side of said cover extending below the peripheral edge of said cover for directing condensate away from said edges of said cover to drip toward the center portion of said tank; and
   D. each said rack being adjustable for supporting the battery plates in said tank and comprising:
      a. a pair of vertical parallel side walls,
      b. a pair of vertically slotted parallel end walls having ends against said side walls, said end walls having alternately notched top edges, and
      c. means for adjusting the distance between said end walls.

* * * * *